US007583957B2

(12) United States Patent
Lee (10) Patent No.: US 7,583,957 B2
(45) Date of Patent: Sep. 1, 2009

(54) METHOD FOR SENDING MESSAGE THAT RECOMMENDS VIEWING DIGITAL MULTIMEDIA BROADCAST AND MOBILE TERMINAL USING THE METHOD

(75) Inventor: Yeon-Ju Lee, Guri-si (KR)

(73) Assignee: Samsung Electronics Co., Ltd. (KR)

( * ) Notice: Subject to any disclaimer, the term of this patent is extended or adjusted under 35 U.S.C. 154(b) by 608 days.

(21) Appl. No.: 11/400,938

(22) Filed: Apr. 10, 2006

(65) Prior Publication Data

US 2007/0047509 A1    Mar. 1, 2007

(30) Foreign Application Priority Data

Aug. 31, 2005    (KR) ...................... 10-2005-0080976

(51) Int. Cl.
*H04L 29/06* (2006.01)
*H04W 4/00* (2009.01)
*H04W 4/12* (2009.01)
*H04M 1/00* (2006.01)
*H04N 7/16* (2006.01)
*H04N 7/173* (2006.01)

(52) U.S. Cl. ..................... 455/414.3; 455/466; 455/566; 725/62; 725/106

(58) Field of Classification Search .................. 370/338; 455/414.3
See application file for complete search history.

(56) References Cited

U.S. PATENT DOCUMENTS

| | | | |
|---|---|---|---|
| 6,865,191 B1 * | 3/2005 | Bengtsson et al. | 455/466 |
| 6,968,364 B1 * | 11/2005 | Wong et al. | 725/135 |
| 7,039,444 B2 * | 5/2006 | Tsukamoto | 455/566 |
| 7,050,836 B2 * | 5/2006 | Paakkonen | 455/466 |
| 2002/0082054 A1 * | 6/2002 | Keinonen et al. | 455/466 |
| 2004/0057387 A1 | 3/2004 | Yi et al. | |
| 2004/0142656 A1 | 7/2004 | Bensimon et al. | |
| 2005/0073974 A1 * | 4/2005 | Kim et al. | 370/329 |
| 2005/0083884 A1 | 4/2005 | Lee et al. | |
| 2005/0091683 A1 * | 4/2005 | Sheynman et al. | 725/34 |
| 2006/0253873 A1 * | 11/2006 | Lim et al. | 725/62 |

FOREIGN PATENT DOCUMENTS

| | | | |
|---|---|---|---|
| TW | M257064 | | 2/2005 |
| WO | WO 2005027460 A1 * | | 3/2005 |

\* cited by examiner

*Primary Examiner*—Nick Corsaro
*Assistant Examiner*—Tangela T. Chambers
(74) *Attorney, Agent, or Firm*—The Farrell Law Firm, LLP (57) ABSTRACT

Disclosed is a method for sending a message that recommends viewing a digital multimedia broadcast to a mobile terminal capable of receiving the digital multimedia broadcasting services. The method includes: in a sender mobile terminal, checking whether digital multimedia broadcasting is currently being provided when a user inputs a request for sending a broadcast recommendation message; generating a broadcast recommendation message, including at least a currently selected channel number and a broadcast identifier indicating that the message is a recommendation to view a digital multimedia broadcast, when digital multimedia broadcasting is currently being provided, and sending the generated message to a recipient mobile terminal; in the recipient mobile terminal, reading the channel number included in the received message when a broadcast identifier is included in the message, and displaying a message content that recommends viewing the broadcast of a corresponding channel; and selecting the corresponding channel when a key for accepting the recommendation is inputted, and providing the digital multimedia broadcast of the selected channel.

45 Claims, 8 Drawing Sheets

FIG.1

| Field | Length (bits) |
|---|---|
| SMS_MSG_TYPE | 8 |

One or more occurrences of the following parameter record:

| PARAMETER_ID | 8 |
|---|---|
| PARAMETER_LEN | 8 |
| Parameter Data | 8xPARAMETER_LEN |

FIG.2

| Parameter | Type |
|---|---|
| Teleservice Identifier | Mandatory |
| Service Category | Optional |
| Originating Address | Mandatory [1] |
| Originating Subaddress | Optional [1] |
| Destination Address | Mandatory [2] |
| Destination SubAddress | Optional [2] |
| Bearer Reply Option | Optional |
| Bearer Data | Optional |
| [1] For Mobile-terminated messages(not present in mobile originated messages) [2] For mobile-originated messages(not present in mobile terminated messages) | |

FIG.3

| Field | Length (bits) |
|---|---|
| PARAMETER_ID | 8 |
| PARAMETER_LEN | 8 |
| IDENTIFIER | 16 |

FIG.4

| Field | Length (bits) |
|---|---|
| SUBPARAMETER_ID | 8 |
| SUBPARAM_LEN | 8 |
| Subparameter Data | 8xSUBPARAM_LEN |

METHOD FOR SENDING MESSAGE THAT RECOMMENDS VIEWING DIGITAL MULTIMEDIA BROADCAST AND MOBILE TERMINAL USING THE METHOD

PRIORITY

This application claims priority to an application entitled "Method for Sending Message that Recommends Viewing Digital Multimedia Broadcast and Mobile Terminal Using the Method" filed with the Korean Intellectual Property Office on Aug. 31, 2005 and assigned Serial No. 2005-80976, the contents of which are incorporated herein by reference.

BACKGROUND OF THE INVENTION

1. Field of the Invention

The present invention relates generally to digital multimedia broadcasting, and in particular, to a method for sending a message that recommends viewing a digital multimedia broadcast and a mobile terminal using the method.

2. Description of the Related Art

In recent years the increasing use of mobile terminals have given way to the rapid growth in the popularity of Short Message Service (SMS). SMS allows convenient visual communication between users. As such, the usage of SMS by people including young children, students and even the elderly continues to grow. Unlike email, SMS messages are almost simultaneously sent and received. SMS has now become a popular means of communication.

Basically, SMS is used to send a short text message with a sender's mobile phone number to an intended recipient or to provide subscribed mobile users with useful information such as weather forecasts, news or stock quotes. Users can search various information offered via SMS and retrieve only necessary information. SMS is becoming available for a wider range of applications including e-payment and e-commerce. For example, most credit card companies have introduced an SMS service system to inform customers of their credit card transactions to help prevent any credit card theft or fraud.

he growing trend of the digital revolution has resulted in a digital multimedia broadcasting that digitally modulates multimedia signals including video and audio signals as well as provides the modulated multimedia signals to handheld receivers. In response, mobile terminals have been developed to have a function for receiving digital multimedia broadcasting services. However, there is still a current need for improvement of the SMS services providing digital broadcasting information to the mobile terminals.

SUMMARY OF THE INVENTION

Accordingly, the present invention has been made to solve the above-mentioned problems occurring in the prior art, and an object of the present invention is to provide a method for sending a message that recommends viewing a digital multimedia broadcast and a mobile terminal using the method.

In order to accomplish the above object of the present invention, there is provided a method for sending a message that recommends viewing a digital multimedia broadcast to a mobile terminal capable of receiving digital multimedia broadcasting services, the method includes: in a sender mobile terminal, checking whether the digital multimedia broadcasting is currently being provided when a request for sending a broadcast recommendation message is inputted; generating the broadcast recommendation message, including at least a currently selected channel number and a broadcast identifier indicating that the message is a recommendation to view a digital multimedia broadcast while the digital multimedia broadcasting is currently being provided, and sending the generated message to a recipient mobile terminal; in the recipient mobile terminal, reading the channel number within the received message when the broadcast identifier is included in the message, and displaying a message content that recommends viewing the broadcast of a corresponding channel; and selecting the corresponding channel when a key for accepting the recommendation is inputted, and providing the digital multimedia broadcast of the selected channel.

In accordance with another aspect of the present invention, there is provided a mobile terminal capable of receiving digital multimedia broadcasting services, which includes a mobile communication unit for sending or receiving a message; a user interface unit for inputting a request to send the message that recommends viewing a digital multimedia broadcast and for displaying content of the message; and a control unit for checking whether digital multimedia broadcasting is being provided when the request is inputted through the user interface unit, for generating a broadcast recommendation message including at least a currently selected channel number and a broadcast identifier indicating that the message is a recommendation to view a digital multimedia broadcast, while digital multimedia broadcasting is currently being provided, and for forwarding the generated message to a recipient mobile terminal.

BRIEF DESCRIPTION OF THE DRAWINGS

The above and other objects, features and advantages of the present invention will be more apparent from the following detailed description when taken in conjunction with the accompanying drawings in which.

DETAILED DESCRIPTION OF THE PREFERRED EMBODIMENT

Hereinafter, preferred embodiments of the present invention will be described with reference to the accompanying drawings. In the following description of the present invention, a detailed description of known functions and configurations incorporated herein will be omitted when it may make the subject matter of the present invention unclear.

Figure 1:
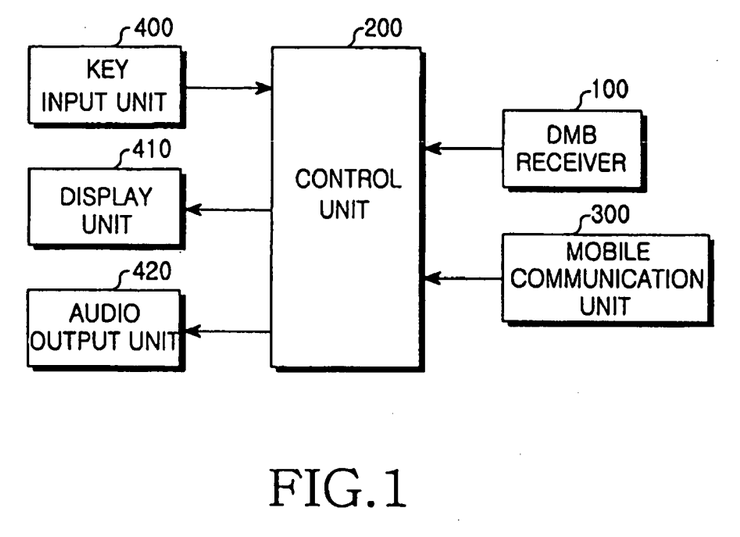
FIG. 1 is a block diagram illustrating a mobile terminal capable of receiving digital multimedia broadcasting services according to the present invention.

FIG. 1 is a block diagram illustrating a mobile terminal capable of receiving digital multimedia broadcasting services according to the present invention.

A Digital Multimedia Broadcasting (DMB) receiver 100 of the mobile terminal receives digital multimedia broadcasting data of a selected channel. Under the control of a control unit 200, the DMB receiver 100 demodulates and decodes the received broadcasting data to convert the data into a recognizable form of audio and video data. A mobile communication unit 300 sends or receives Short Message Services (SMS)

or Multimedia Message Service (MMS) messages under the control of the control unit 200. The mobile communication unit 300 also sends or receives typical calls and data related signals.

A user interface unit consists of a key input unit 400, a display unit 410 and an audio output unit 420. When a user presses a key to request the sending of a message that recommends viewing a digital multimedia broadcast, or a key to generate or confirm the broadcast recommendation message, the key input unit 400 generates a signal corresponding to the pressed key and outputs the generated signal to the control unit 200. When a broadcast recommendation message is received through the mobile communication unit 300, the display unit 410 displays the received recommendation message. Under the control of the control unit 200, the display unit 410 displays pictures necessary to generate the recommendation message which will be sent to a recipient terminal. Also, under the control of the control unit 200, the display unit 410 receives video data converted from digital multimedia broadcasting data by the DMB receiver 100 and displays the received video data. The audio output unit 410 receives audio data converted from digital multimedia broadcasting data by the DMB receiver 100 and outputs the received audio data under the control of the control unit 200.

When a request for sending a broadcast recommendation message is inputted through the key input unit 400, the control unit 200 checks whether digital multimedia broadcasting is currently being provided on the mobile terminal. If digital multimedia broadcasting is currently being provided, the control unit 200 generates a message including at least the currently selected channel number and a broadcast identifier indicating that the message is a recommendation to view the broadcast. Otherwise, the control unit 200 controls the display unit 410 to display a picture for inputting the channel number. When the user inputs the channel number through the key input unit 400, the control unit 200 then generates a message including the inputted channel number and the broadcast identifier. Hereinafter, a process for generating an SMS message that recommends viewing a digital multimedia broadcast according to the present invention will be explained with reference to FIGS. 2 through 5.

FIGS. 2 through 5 are tables showing the fields necessary to create an SMS message according to general standards.

Figure 2:
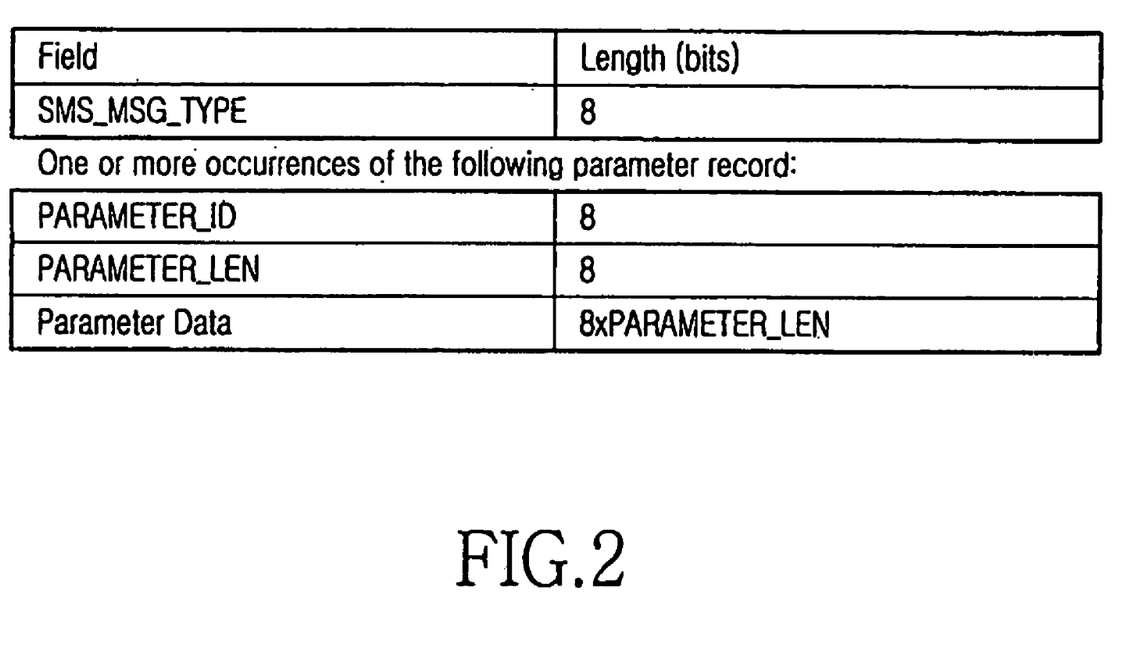
FIGS. 2 through 5 are tables showing the fields necessary to create an SMS message according to general standards.
Figure 3:
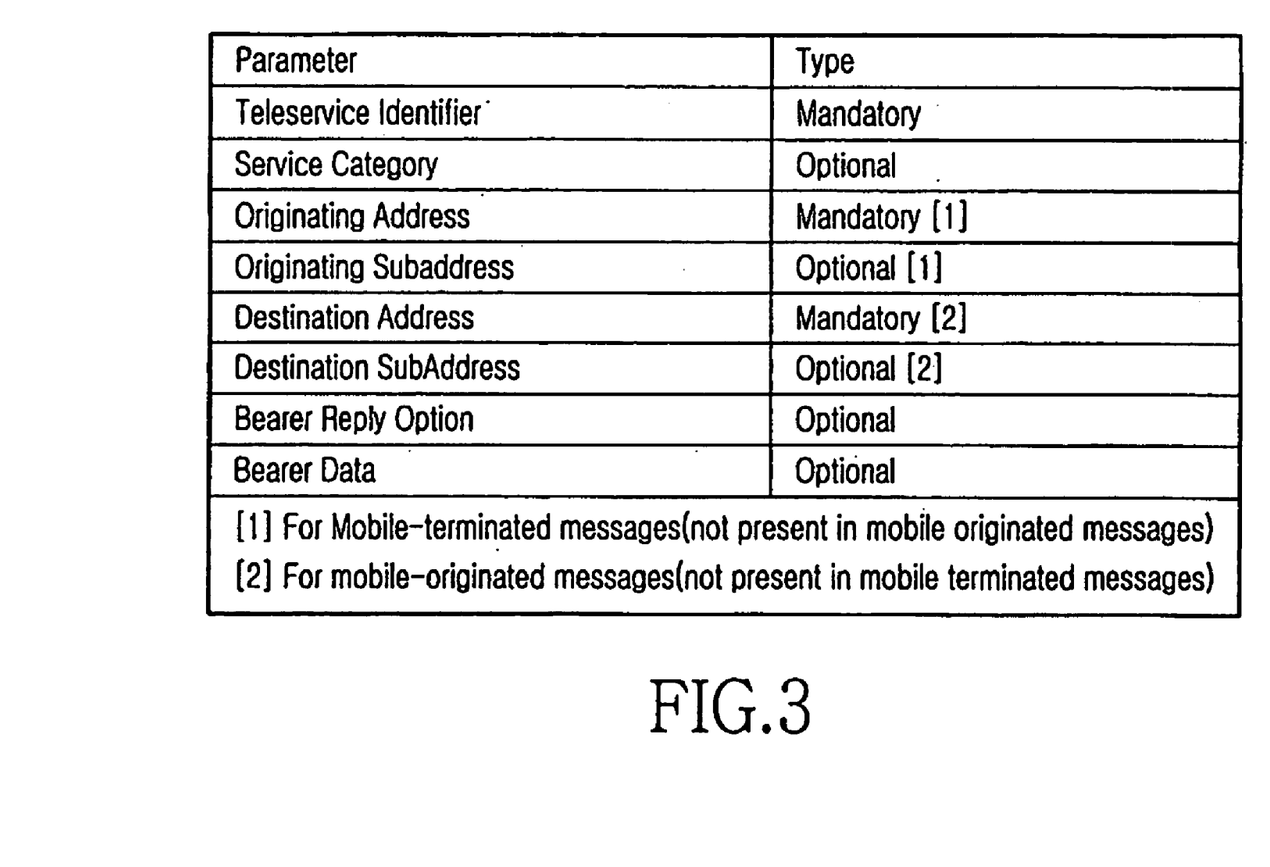
Figure 4:
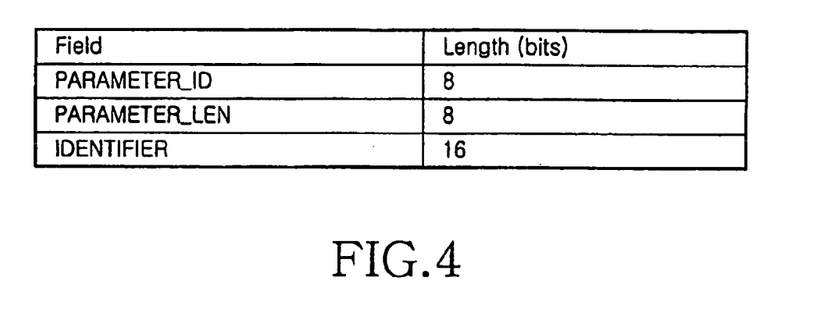

To create the broadcast recommendation message in an SMS format, parameter ID among the fields in FIG. 2 should be a teleservice identifier. The parameter ID field may have values as shown in FIG. 3. When the parameter ID field is a teleservice identifier, it is constructed as shown in FIG. 4. The value of the teleservice identifier is important to create the broadcast recommendation message in an SMS format.

Figure 5:
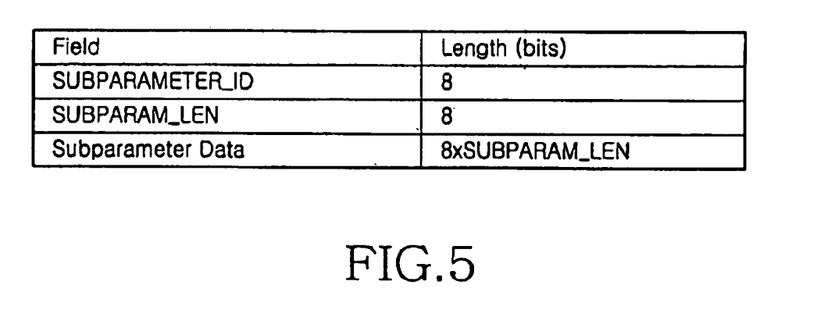

The value of the teleservice identifier is used to classify a message into an SMS, MMS or Cell Broadcasting Message (CBS). Each teleservice identifier value corresponding to SMS, MMS or CBS is coded with mobile service provider networks. According to the present invention, a newly defined value of the teleservice identifier is used to indicate the broadcast recommendation message. An SMS message classified into a broadcast recommendation message contains additional fields as shown in FIG. 5 to allocate a space for storing a broadcast channel number.

The control unit 200 sets the parameter ID to the newly defined value of the teleservice identifier. Among the fields in FIG. 5 which are added to an SMS message classified into a broadcast recommendation message, subparameter ID is set to an identifier indicating a broadcast channel number in order to notify the recipient that the broadcast channel number is included in the broadcast recommendation message.

Then, the control unit 200 sets subparameter data to the currently selected channel number or the user inputs the channel number directly through the key input unit 400 so that the channel number can be included in the broadcast recommendation message. Thus, the broadcast recommendation message including at least the currently selected channel number or the channel number inputted by the user and the broadcast identifier can be created in an SMS format.

Hereinafter, a process for generating a broadcast recommendation message in SMS format, including a broadcast channel number and a broadcast identifier, according to the present invention will be explained. The control unit 200 allocates a space in a message content field of the broadcast recommendation message and stores the broadcast identifier and the currently selected channel number or a channel number inputted by the user through the key input unit 400 in the allocated space. The control unit 200 then generates the broadcast recommendation message in SMS format including at least the broadcast identifier and the currently selected or directly inputted channel number.

When digital multimedia broadcasting is currently being provided on the mobile terminal, the control unit 200 displays a picture for changing the channel to a channel number other than the currently selected one on the display unit 410, without including the currently selected channels number in the broadcast recommendation message. To this end, the control unit 200 activates a cursor to allow the user to change channels while displaying the currently selected channel number on the display unit 410. Thus, the user can directly select a desired channel number other than the currently selected one through the key input unit 400. When the user changes the channel as desired by moving the cursor through the key input unit 400, the control unit 200 would then have the channel number selected through the key input unit 400 in the broadcast recommendation message.

When a channel number is set in the picture displaying the currently selected channel number or in the picture for changing the channel as desired, the control unit 200 then displays a picture for inputting text content on the display unit 410. When the user through the key input unit 400 inputs text content to be sent to an intended recipient, the control unit 200 incorporates the inputted content in the broadcast recommendation message.

In addition, the control unit 200 provides a menu for capturing a still image or a motion picture from the broadcast of the currently selected channel and including the captured still images or motion picture in the broadcast recommendation message. In this connection, the control unit 200 displays a menu for storing content together with the picture for inputting text content on the display unit 410 so that the user can include any selected still image or motion picture of the currently selected channel in the broadcast recommendation message. When the user selects the above menu through the key input unit 400, the control unit 200 displays a picture for selecting either the still image storage or the motion picture storage on the display unit 410.

When the user selects the still image storage through the key input unit 400, the control unit 200 then displays a picture for inputting a number of the captured still images on the display unit 410. At this time, a maximum number of the captured still images that can be included in the broadcast recommendation message is indicated in the picture for inputting the number of the captured still images so that a number which is not greater than the maximum number should be inputted. When the user inputs a desired number of captured still images through the key input unit 400, the control unit 200 captures the inputted number of still images from the broadcast of the currently selected channel and then includes the captured still images in the broadcast recommendation message.

On the other hand, when the user selects the motion picture storage under the menu for storing content, the control unit 200 displays a picture for capturing a motion picture from the broadcast of the currently selected channel. Also, the control unit 200 displays a graph showing the maximum amount of time allowed for storage of a motion picture in the broadcast recommendation message within the storage capacity. The user can capture the motion picture up to the maximum capacity for the allowed maximum amount of time or stop capturing the motion picture earlier. When the motion picture is captured within the storage capacity, the control unit 200 then includes the captured motion picture in the broadcast recommendation message.

After including the broadcast identifier, broadcast channel number, text content and still images or motion picture in the broadcast recommendation message, the control unit 200 displays a picture for inputting the recipient's mobile phone number which will receive the broadcast recommendation message. When the user inputs the recipient's mobile phone number through the key input unit 400 and finally presses an OK key, the control unit 200 controls the mobile communication unit 300 to send the broadcast recommendation message, which includes the broadcast identifier, channel number, text content and still images or motion picture, to the inputted mobile phone number of the recipient.

Hereinafter, the mobile terminal's operations performed when receiving a broadcast recommendation message from another mobile terminal will be explained in detail below. When a specific message is received from another mobile terminal, the control unit 200 determines whether the received message includes a broadcast identifier. If the broadcast identifier is included in the message, the control unit 200 will recognize that the message is a recommendation to view a broadcast. The control unit 200 will also confirm whether digital multimedia broadcasting is currently being provided on the mobile terminal (in other words, whether the DMB receiver 100 is currently operating). If the operation of the DMB receiver 100 is confirmed, the control unit 100 will read a broadcast channel number included in the message and determine whether the currently selected channel number is identical to the channel number included in the message. If the currently selected channel number is identical to the channel number included in the message, the control unit 200 will display a new message alert which is typically used when a new message is received. At this time, the control unit 200 still outputs the digital multimedia broadcast of the currently selected channel through the display unit 410 and the audio output unit 420.

If the currently selected channel number is not identical to the channel number included in the received message, the control unit 200 will also read the text content and still image or motion picture included in the received message. Then the control unit 200 will display on the display unit 410 the message that recommends viewing the broadcast of the pertinent channel number, together with the still images or moving picture included in the message.

Upon the user pressing a key for accepting the recommendation to view the broadcast through the key input unit 400, the control unit 200 then selects a channel corresponding to the channel number included in the message and receives digital multimedia broadcasting data of the selected channel through the DMB receiver 100. The DMB receiver 100 modulates and decodes the received digital multimedia broadcasting data to convert it into a recognizable form of video and audio data. The control unit 200 outputs the video and audio data to the display unit 410 and the audio output unit 420, respectively.

If the DMB receiver 100 is inoperative when the broadcast recommendation message is received, the control unit 100 will read the broadcast channel number included in the received message. If any text content, still image or motion picture is included in the received message, the control unit 200 will also read the included text content, still image or motion picture. Thereafter, the control unit 200 will display the message that recommends viewing the broadcast of the channel number included in the message, together with the still image or moving picture included in the message.

Upon the user pressing a key for accepting the recommendation to view the broadcast through the key input unit 400, the control unit 200 changes the current mode of the mobile terminal to the digital multimedia broadcasting mode and receives digital multimedia broadcasting data of the pertinent channel through the DMB receiver 100. The DMB receiver 100 modulates and decodes the received digital multimedia broadcasting data to convert it into a recognizable form of video and audio data. The control unit 200 outputs the video and audio data to the display unit 410 and the audio output unit 420, respectively.

Figure 6A:
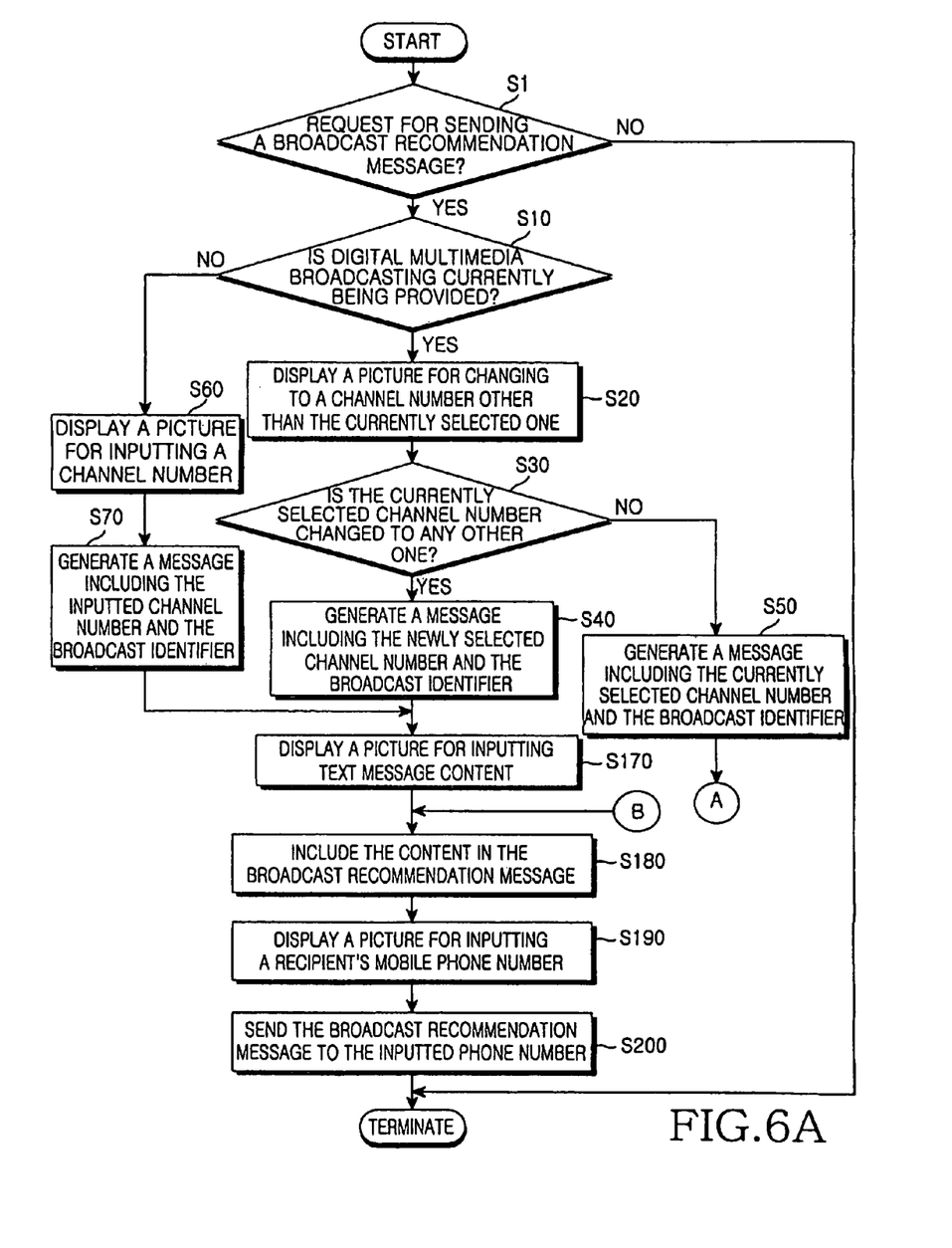
FIG. 6 is a flow chart of a method for showing a process for sending a message that recommends viewing a digital multimedia broadcast to a recipient mobile terminal according to the present invention.

FIG. 6 is a flow chart showing a process for sending a message that recommends viewing a digital multimedia broadcast to a recipient mobile terminal according to the present invention.

The control unit 200 determines whether a key of the key input unit 400 is pressed to request the sending of a broadcast recommendation message (S1). When the key is pressed, the control unit 200 confirms whether digital multimedia broadcasting is currently being provided (S10) on the mobile terminal. When digital multimedia broadcasting is currently being provided, the control unit 200 displays a picture for changing channel to a channel number other than the currently selected one (S20) on the display unit 410. To this end, the control unit 200 activates a cursor to allow the user to change channel while displaying the currently selected channel number on the display unit 410.

Thereafter, the user can change channel as desired by moving the cursor through the key input unit 400. The control unit 200 determines whether the user changes the channel from the currently selected channel to another (S30) through the key input unit 400. When a channel change is detected, the control unit 200 generates a message including the newly selected channel number and a broadcast identifier (S40). On the other hand, when there is no channel change, the control unit 200 then generates a message including the currently selected channel number and the broadcast identifier (S50).

If it is determined that digital multimedia broadcasting is not currently being provided (S10), the control unit 200 will then display a picture for inputting a broadcast channel number on the display unit 410. When the user inputs a desired channel number through the key input unit 400, the control unit 200 generates a message including the inputted channel number and the broadcast identifier (S70).

In summary, the broadcast recommendation message which includes the channel number and the broadcast identifier is generated at step S40, S50 or S70. Hereinafter, step S50 for including text content, still images or a motion picture in the broadcast recommendation message will be explained in more detail with reference to the flow chart (S80 through S160) of FIG. 6B.

Figure 6B:
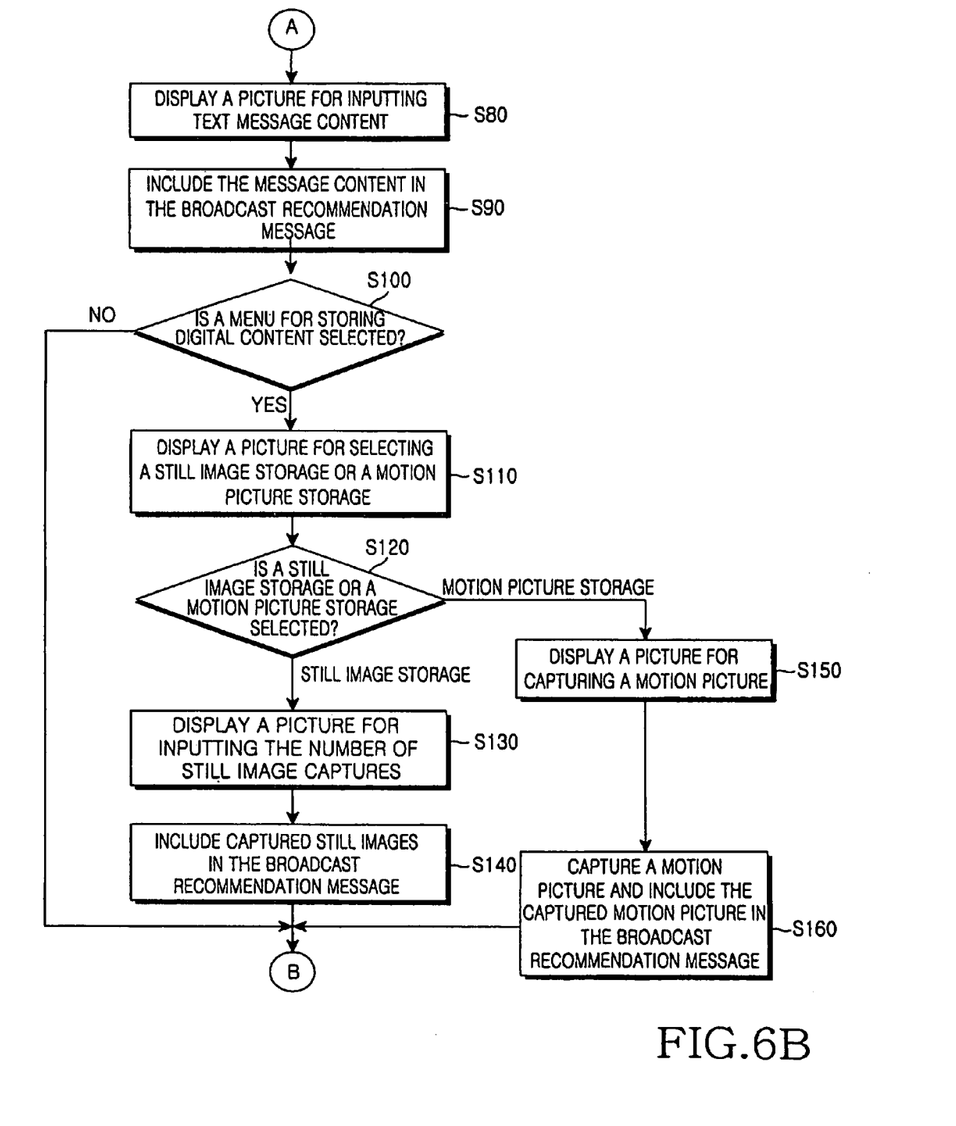

When a broadcast recommendation message which includes a channel number and a broadcast identifier is generated at step S50, the control unit 200 displays a picture for inputting text message content (S80) on the display unit 410. When the user inputs text content to be delivered to the recipient mobile terminal through the key input unit 400, the control unit 200 includes the inputted text content to the broadcast recommendation message (S90). A menu for storing content is displayed on the display unit 410, together with the picture for inputting text content. The control unit 200 determines whether the user presses a key of key input unit 400 to select that menu (S100).

When the user selects the above menu through the key input unit 400, the control unit 200 displays a picture for selecting either a still image storage or a motion picture storage (S110) on the display unit 410. Thus, the user can incorporate the still image or motion picture in the broadcast recommendation message. In this connection, the control unit 200 checks whether the still image storage or the motion picture storage is selected (S120) through the key input unit 410.

When the selection of the still image storage is detected at the step S120, the control unit 200 displays a picture for inputting the number of the captured still images on the display unit 400. At this time, a maximum number of the captured still images that can be included in the broadcast recommendation message is also indicated in the picture for inputting the number of the captured still image so that a number which is not greater than the maximum number should be input. When the user inputs a desired number of captured still image through the key input unit 400, the control unit 200 captures the input number of still images from the broadcast of the currently selected channel and then includes the captured still images in the broadcast recommendation message (S140).

Whereas, when the selection of the motion picture storage is detected at step S120, the control unit 200 displays a picture for capturing a motion picture from the broadcast of the currently selected channel (S150). The control unit 200 also displays a graph showing the maximum amount of time allowed for storage of a motion picture in the broadcast recommendation message within a storage capacity. The user can either capture a motion picture up to the maximum storage capacity for the allowed maximum amount of time or stop capturing the motion picture earlier. When the motion picture is captured within the storage capacity, the control unit 200 then includes the captured motion picture in the broadcast recommendation message (S160).

In the process of steps S80 to S160, the broadcast channel number, text content and still images or motion picture are included in the broadcast recommendation message. When a broadcast recommendation message is generated after a change to a channel number other than the channel currently selected, or after direct input of a desired channel number (S40 or S70), the control unit 200 includes text message content in the generated message through steps S170 and S180.

When a broadcast recommendation message including a channel number and a broadcast identifier is generated at step S50 or S70, the control unit 200 displays a picture for inputting text message content (S170) on the display unit 410. When the user inputs text content to be delivered to the recipient mobile terminal through the key input unit 400, the control unit 200 includes the input text content to the broadcast recommendation message (S180).

After incorporating the broadcast identifier, broadcast channel number, text content and still images or motion picture in the broadcast recommendation message, the control unit 200 displays a picture for inputting the mobile phone number of the recipient which will receive the broadcast recommendation message (S190). When the user inputs the recipient's mobile phone number through the key input unit 400 and finally presses the OK key, the control unit 200 controls the mobile communication unit 300 to send the broadcast recommendation message to the input mobile phone number (S200). Hereinafter, a process for receiving a broadcast recommendation message from another mobile terminal and processing the received message will be explained in detail with reference to FIGS. 7A and 7B.

Figure 7A:
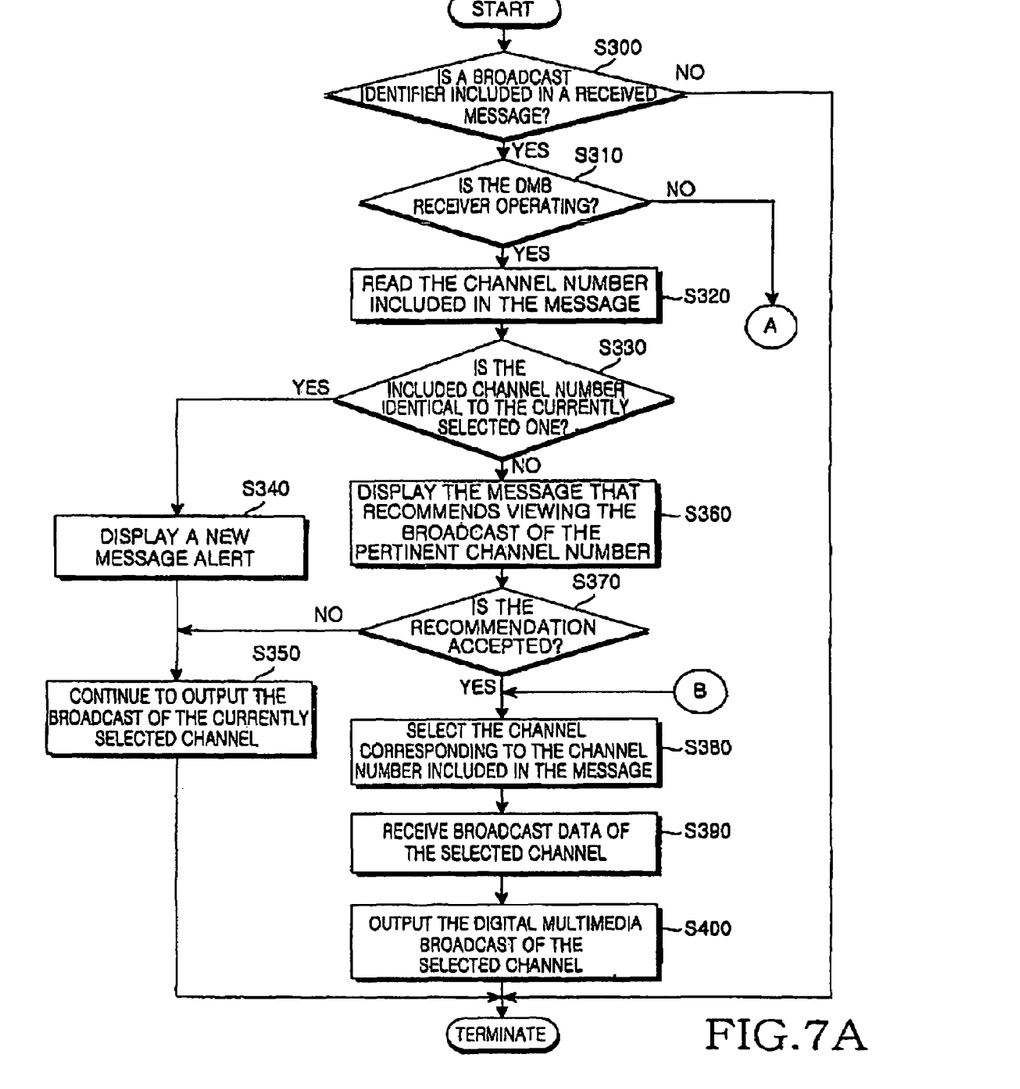
FIGS. 7A and 7B are a flow charts showing a process for receiving and processing a message that recommends viewing a digital multimedia broadcast according to the present invention.
Figure 7B:
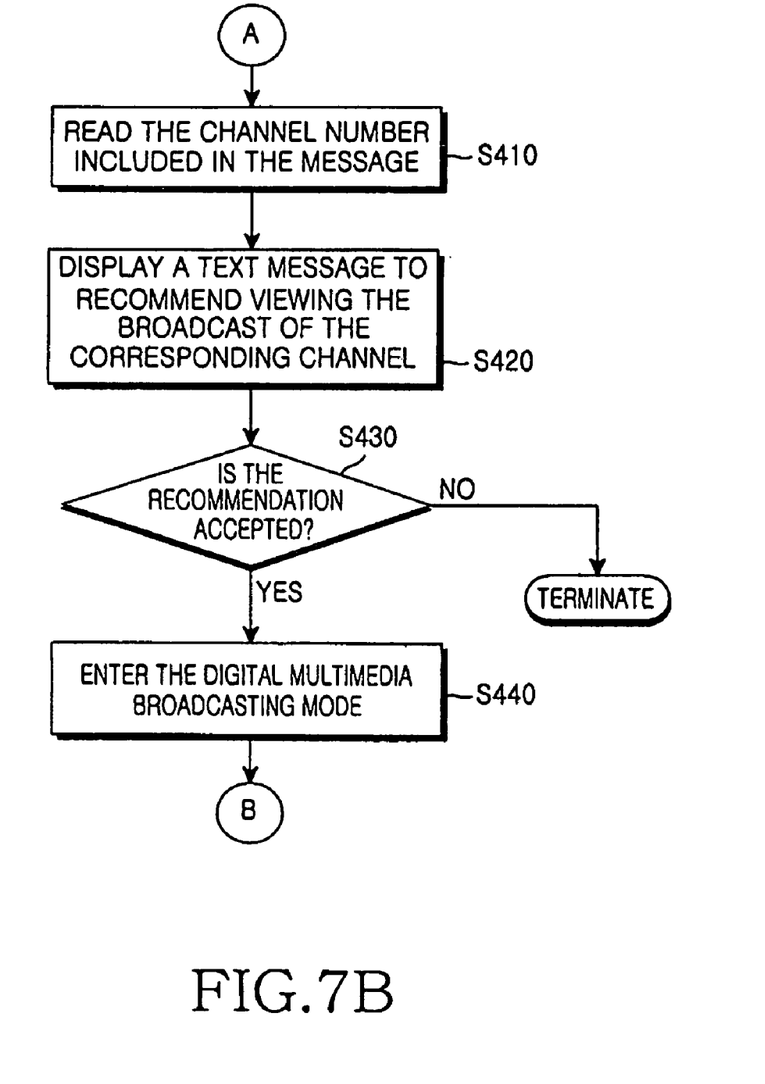

FIGS. 7A and 7B are a flow charts showing a process for receiving and processing a message that recommends viewing a digital multimedia broadcast according to the present invention.

When a specific message sent from another mobile terminal is received through the mobile communication unit 300, the control unit 200 determines whether the received message includes a broadcast identifier (S300). If a broadcast identifier is included in the message, the control unit 200 will recognize that the message is a recommendation to view a broadcast and will also confirm whether digital multimedia broadcasting is currently being provided on the mobile terminal (in other words, whether the DMB receiver 100 is currently operating) (S310).

Upon confirmation that the DMB receiver is operating, the control unit 100 will read a broadcast channel number included in the message (S320) and will then determine whether the currently selected channel number is identical to the channel number included in the message (S330). If the currently selected channel number is identical to the channel number included in the message, the control unit 200 will display a new message alert which is typically used when a new message is received (S340). After displaying the new message alert, the control unit 200 continues to output the digital multimedia broadcast of the currently selected channel (S350) through the display unit 410 and the audio output unit 420.

If the currently selected channel number is not identical to the channel number included in the received message, the control unit 200 will also read the text content and still image or motion picture included in the received message. Thereafter, the control unit 200 will display, on the display unit 410, the message that recommends viewing the broadcast of the pertinent channel number, together with the still images or moving picture included in the message (S360). The user may press a key of the key input unit 400 for accepting the recommendation to view the broadcast. In this connection, the control unit 200 determines whether there is a key input to accept the recommendation (S370).

If a key input to accept the recommendation is detected, the control unit 200 will select a channel corresponding to the channel number included in the message (S380) and will then receive digital multimedia broadcasting data of the selected channel through the DMB receiver 100 (S390). The DMB receiver 100 modulates and decodes the received digital multimedia broadcasting data to convert it into a recognizable form of video and audio data. The control unit 200 outputs the video and audio data to the display unit 410 and the audio output unit 420, respectively (S400). On the other hand, if the user does not press a key to accept the recommendation, the control unit 200 will proceed to step S350 to continue to output the digital multimedia broadcasting data of the currently selected channel through the display unit 410 and the audio output unit 420.

If it is confirmed that the DMB receiver 100 is not in operation (S310), the control unit 100 will read the broadcast channel number included in the received message (S410). If any text content, still image or motion picture is also included in the received message, the control unit 200 will also read the included text content, still image or motion picture. Then the control unit 200 will display the message that recommends viewing the broadcast of the pertinent channel number, together with the still image or moving picture included in the message (S420). The user may press a key through the key input unit 400 to accept the recommendation to view the broadcast. In this connection, the control unit 200 determines whether a key is pressed to accept the recommendation (S430).

When the input of a key for accepting the recommendation is detected, the control unit 200 then changes the current mode of the mobile terminal to a digital multimedia broadcasting mode (S440). In the digital multimedia broadcasting mode, the control unit 200 selects the channel corresponding to the channel number included in the broadcast recommendation message (S450). Subsequently, the control unit 200 proceeds to steps S390 through S400 to provide the user with digital multimedia broadcasting data of the selected channel.

As explained above, a user who is currently viewing a digital multimedia broadcast over a mobile terminal can send a message that recommends viewing the same digital multimedia broadcast to another mobile terminal. When a recipient of the message presses a key to accept the recommendation, the recipient's mobile terminal automatically outputs the digital multimedia broadcast data of the channel corresponding to the channel number included in the message.

The user can send the broadcast recommendation message even when the digital multimedia data is not being viewed.

Since the broadcast recommendation message includes channel information, text message content and any still image or motion picture extracted from the broadcast of the pertinent channel, the recipient can see images of the information on the recommended broadcast before accepting the recommendation.

While the present invention has been shown and described with reference to a certain preferred embodiment thereof, it will be understood that those skilled in the art will appreciate that various modifications, additions and substitutions are possible, without departing from the scope and spirit of the invention as disclosed in the accompanying claims, including the full scope of equivalents thereof.

What is claimed is:

1. A method for sending a message that recommends viewing a digital multimedia broadcast to a mobile terminal capable of receiving digital multimedia broadcasting services, the method comprising the steps of:
   in a sender mobile terminal,
   checking whether digital multimedia broadcasting is currently being provided when a user inputs a request for sending a broadcast recommendation message;
   generating the broadcast recommendation message, including at least a currently selected channel number and a broadcast identifier indicating that the message is a recommendation to view a digital multimedia broadcast, when digital multimedia broadcasting is currently being provided, and sending the generated message to a recipient mobile terminal;
   in the recipient mobile terminal,
   reading the channel number included in the received message when the broadcast identifier is included in the message, and displaying a message content that recommends viewing the broadcast of a corresponding channel; and
   selecting the corresponding channel when a key is pressed for accepting the recommendation, and providing the digital multimedia broadcast of the selected channel.

2. The method as claimed in claim 1, further comprising, in the sender mobile terminal, allowing the user to input a mobile phone number of the recipient mobile terminal and sending the broadcast recommendation message to the input telephone number.

3. The method as claimed in claim 1, further comprising, in the sender mobile terminal,
   allowing the user to input a broadcast channel number and thereby changing the currently selected channel number to the input one; and
   generating a broadcast recommendation message having at least the input channel number and the broadcast identifier.

4. The method as claimed in claim 1, further comprising, in the sender mobile terminal,
   allowing the user to input a broadcast channel number when digital multimedia broadcasting is not currently being provided; and
   generating the broadcast recommendation message including at least the input channel number and the broadcast identifier.

5. The method as claimed in claim 4, further comprising setting an identifier value of a teleservice identifier to the broadcast identifier when a parameter ID field among fields necessary to create an SMS message is the teleservice identifier and storing the currently selected channel number in a space allocated to store a channel number in an SMS message classified into a broadcast recommendation message in order to send the broadcast recommendation message in an SMS format.

6. The method as claimed in claim 5, further comprising
   setting a subparameter ID to an identifier indicating a broadcast channel number in order to inform that a broadcast channel number is included in the broadcast recommendation message; and
   setting subparameter data for including a broadcast channel number in the message to the currently selected channel number.

7. The method as claimed in claim 6, further comprising setting the subparameter data to the channel number input by the user.

8. The method as claimed in claim 4, further comprising allocating a space for storing the broadcast identifier and the broadcast channel number in a message content field to send the broadcast recommendation message in an SMS format.

9. The method as claimed in claim 1, further comprising, in the sender mobile terminal,
   allowing the user to input a text message content; and
   including the input message content in the broadcast recommendation message.

10. The method as claimed in claim 9, further comprising, in the recipient mobile terminal,
    checking whether digital multimedia broadcasting is currently being provided when the broadcast identifier is included in the received message;
    checking whether the channel number included in the message is identical to the currently selected channel number if digital multimedia broadcasting is currently being provided;
    displaying a message that recommends viewing the broadcast of a channel corresponding to the channel number included in the message when the channel number included in the message is not identical to the currently selected channel number; and
    providing the digital multimedia broadcast of the corresponding channel when a key is pressed for accepting the recommendation.

11. The method as claimed in claim 10, further comprising displaying text message content, a still image or a motion picture when any one of the text message content, still image and motion picture is included in the received message.

12. The method as claimed in claim 10, further comprising providing the digital multimedia broadcast of the currently selected channel when a key is not pressed for accepting the recommendation.

13. The method as claimed in claim 10, further comprising providing the digital multimedia broadcast of the currently selected channel when the channel number included in the message is identical to the currently selected channel number.

14. The method as claimed in claim 13, further comprising displaying a new message alert to inform that the message is received.

15. The method as claimed in claim 10, further comprising
displaying a message content that recommends viewing the broadcast of a channel corresponding to the channel number included in the message when digital multimedia broadcasting is not currently being provided; and
entering a digital multimedia broadcasting mode when a key is pressed for accepting the recommendation, selecting the corresponding channel and providing the digital multimedia broadcast of the selected channel.

16. The method as claimed in claim 15, further comprising reading and displaying text message content, a still image or a motion picture when any of the text message content, still image and motion picture is included in the received message.

17. The method as claimed in claim 1, further comprising, in the sender mobile terminal
capturing still images from the broadcast of the currently selected channel within a storage capacity to be included in the broadcast recommendation message; and
including the captured still images in the broadcast recommendation message.

18. The method as claimed in claim 17, further comprising:
displaying a maximum number of still images that can be included in the broadcast recommendation message; and
when the user inputs a desired number of still images, capturing the input number of still images from the broadcast of the currently selected channel and then including the captured still images in the broadcast recommendation message.

19. The method as claimed in claim 17, further comprising, in the recipient mobile terminal,
checking whether digital multimedia broadcasting is currently being provided when a broadcast identifier is included in the received message;
checking whether a channel number included in the message is identical to the currently selected channel number if digital multimedia broadcasting is currently being provided;
displaying a message that recommends viewing the broadcast of a channel corresponding to the channel number included in the message when the channel number included in the message is not identical to the currently selected channel number; and
providing the digital multimedia broadcast of the corresponding channel when a key is pressed for accepting the recommendation.

20. The method as claimed in claim 1, further comprising, in the sender mobile terminal,
capturing a motion picture from the broadcast of the currently selected channel within the storage capacity to be included in the broadcast recommendation message; and
including the captured motion picture in the broadcast recommendation message.

21. The method as claimed in claim 20, further comprising:
displaying a graph showing the maximum amount of time allowed for storage of a motion picture in the broadcast recommendation message within the storage capacity; and
capturing a motion picture according to the user's demand and including the captured motion picture in the broadcast recommendation message.

22. The method as claimed in claim 20, further comprising, in the recipient mobile terminal,
checking whether digital multimedia broadcasting is currently being provided when the broadcast identifier is included in the received message;
checking whether the channel number included in the message is identical to the currently selected channel number if digital multimedia broadcasting is currently being provided;
displaying a message that recommends viewing the broadcast of a channel corresponding to the channel number included in the message when the channel number included in the message is not identical to the currently selected channel number; and
providing the digital multimedia broadcast of the corresponding channel when a key is pressed for accepting the recommendation.

23. A mobile terminal capable of receiving digital multimedia broadcasting services, which comprises:
a mobile communication unit for sending and/or receiving a message;
a user interface unit for inputting a request to send a message that recommends viewing a digital multimedia broadcast and for displaying content of the message; and
a control unit for checking whether digital multimedia broadcasting is being provided when a user inputs the request through the user interface unit, for generating a broadcast recommendation message including at least a currently selected channel number and a broadcast identifier indicating that the message is a recommendation to view a digital multimedia broadcast, when digital multimedia broadcasting is currently being provided, and for sending the generated message to a recipient mobile terminal.

24. The mobile terminal as claimed in claim 23, wherein said control unit:
reads the channel number included in the message received through the mobile communication unit when the broadcast identifier is included in the message, and displays a message content that recommends viewing the broadcast of a channel corresponding to the channel number through the user interface unit; and
selects the corresponding channel when a key for accepting the recommendation is pressed through the user interface unit, and outputs the digital multimedia broadcast of the selected channel.

25. The mobile terminal as claimed in claim 24, wherein said control unit includes text message content input by the user through the user interface unit in the broadcast recommendation message.

26. The mobile terminal as claimed in claim 25, wherein said control unit performs the operations of:
checks whether digital multimedia broadcasting is currently being provided when the broadcast identifier is included in the received message;

checks whether the channel number included in the message is identical to the currently selected channel number if digital multimedia broadcasting is currently being provided;

displays a message that recommends viewing the broadcast of a channel corresponding to the channel number included in the message when the channel number included in the message is not identical to the currently selected channel number; and selects the corresponding channel when a key is pressed for accepting the recommendation, and provides the digital multimedia broadcast of the selected channel.

27. The mobile terminal as claimed in claim 26, wherein the control unit reads and displays text message content, still image or motion picture through the user interface unit when any of the text message content, a still image and a motion picture is included in the received message.

28. The mobile terminal as claimed in claim 26, wherein the control unit outputs the digital multimedia broadcast of the currently selected channel through the user interface unit when a key is pressed for accepting the recommendation.

29. The mobile terminal as claimed in claim 26, wherein the control unit outputs the digital multimedia broadcast of the currently selected channel through the user interface unit when the channel number included in the message is identical to the currently selected channel number.

30. The mobile terminal as claimed in claim 29, wherein the control unit displays a new message alert through the user interface unit to inform that the message is received.

31. The mobile terminal as claimed in claim 26, wherein the control unit:

displays through the user interface unit a message content that recommends viewing the broadcast of a channel corresponding to the channel number included in the message when digital multimedia broadcasting is not currently being provided; and enters a digital multimedia broadcasting mode when a key is pressed for accepting the recommendation, selects the corresponding channel and provides the digital multimedia broadcast of the selected channel.

32. The mobile terminal as claimed in claim 31, wherein the control unit reads and displays text message content, a still image or a motion picture when any of the text message content, still image and motion picture is included in the received message.

33. The mobile terminal as claimed in claim 24, wherein the control unit captures still images from the broadcast of the currently selected channel within a storage capacity to be included in the broadcast recommendation message and includes the captured still images in the broadcast recommendation message.

34. The mobile terminal as claimed in claim 33, wherein the control unit performs the operations of:

displays a maximum number of still images that can be included in the broadcast recommendation message; and when the user inputs a desired number of still images, captures the inputted number of still images from the broadcast of the currently selected channel and then includes the captured still images in the broadcast recommendation message.

35. The mobile terminal as claimed in claim 33, wherein said control unit:

checks whether digital multimedia broadcasting is currently being provided when a broadcast identifier is included in the received message;

checks whether the channel number included in the message is identical to the currently selected channel number if digital multimedia broadcasting is currently being provided;

displays a message that recommends viewing the broadcast of a channel corresponding to the channel number included in the message when the channel number included in the message is not identical to the currently selected channel number; and selects the corresponding channel when a key is pressed for accepting the recommendation, and provides the digital multimedia broadcast of the selected channel.

36. The mobile terminal as claimed in claim 24, wherein the control unit captures a motion picture from the broadcast of the currently selected channel within a storage capacity to be included in the broadcast recommendation message and includes the captured motion picture in the broadcast recommendation message.

37. The mobile terminal as claimed in claim 36, wherein the control unit:

displays a graph showing the maximum amount of time allowed for storage of a motion picture in the broadcast recommendation message within the storage capacity; and captures a motion picture according to the user's demand and includes the captured motion picture in the broadcast recommendation message.

38. The mobile terminal as claimed in claim 36, wherein said control unit:

checks whether digital multimedia broadcasting is currently being provided when the broadcast identifier is included in the received message;

checks whether the channel number included in the message is identical to the currently selected channel number if digital multimedia broadcasting is currently being provided;

displays a message that recommends viewing the broadcast of a channel corresponding to the channel number included in the message when the channel number included in the message is not identical to the currently selected channel number; and selects the corresponding channel when a key is pressed for accepting the recommendation, and provides the digital multimedia broadcast of the selected channel.

39. The mobile terminal as claimed in claim 23, wherein said control unit allows the user to input a mobile phone number of the recipient mobile terminal through the user interface unit and sends the broadcast recommendation message to the input mobile phone number.

40. The mobile terminal as claimed in claim 23, wherein said control unit changes the currently selected channel number when the user inputs another channel number through the user interface unit, and generates a broadcast recommendation message including at least the input channel number and the broadcast identifier.

41. The mobile terminal as claimed in claim 23, wherein the control unit sets an identifier value of a teleservice identifier to the broadcast identifier when a parameter ID field among fields necessary to create an SMS message is the teleservice identifier and stores the currently selected channel number in a space allocated to store a channel number in an SMS message classified into a broadcast recommendation message in order to send the broadcast recommendation message in an SMS format.

42. The mobile terminal as claimed in claim 41, wherein the control unit sets a subparameter ID to an identifier indicating a broadcast channel number in order to inform that data included in the broadcast recommendation message is a broadcast channel number, and sets subparameter data for including a broadcast channel number in the message to the currently selected channel number.

43. The mobile terminal as claimed in claim 42, wherein the control unit allows the user to input a broadcast channel number through the user interface unit when digital multimedia broadcasting is not being provided, and generates a broadcast recommendation message including the input channel number and the broadcast identifier.

44. The mobile terminal as claimed in claim 43, wherein the control unit sets the subparameter data to the channel number input by the user.

45. The mobile terminal as claimed in claim 44, wherein the control unit allocates a space for storing the broadcast identifier and the broadcast channel number in a message content field to send the broadcast recommendation message in an SMS format.

* * * * *

UNITED STATES PATENT AND TRADEMARK OFFICE
CERTIFICATE OF CORRECTION

PATENT NO. : 7,583,957 B2 Page 1 of 1
APPLICATION NO. : 11/400938
DATED : September 1, 2009
INVENTOR(S) : Yeon-Ju Lee It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 752 days.

Signed and Sealed this

Fourteenth Day of December, 2010

David J. Kappos
*Director of the United States Patent and Trademark Office*